United States Patent [19]

Hinze

[11] Patent Number: 4,846,865
[45] Date of Patent: Jul. 11, 1989

[54] CLAD PRECIOUS METAL BUSHING AND METHOD FOR MAKING

[75] Inventor: Jay W. Hinze, Newark, Ohio

[73] Assignee: Owens-Corning Fiberglas Corporation, Toledo, Ohio

[21] Appl. No.: 168,205

[22] Filed: Mar. 15, 1986

[51] Int. Cl.⁴ .......................................... C03B 37/095
[52] U.S. Cl. ................................................ 65/1; 65/2;
 65/374.11; 65/374.13; 427/124; 427/125
[58] Field of Search ............... 65/1, 2, 374.11, 374.13;
 427/124, 125

[56] References Cited

U.S. PATENT DOCUMENTS

| | | |
|---|---|---|
| 2,777,254 | 1/1957 | Siefert et al. |
| 3,350,182 | 10/1967 | Hunter et al. ............................. 65/1 |
| 3,685,978 | 8/1972 | Hansen et al. ............................. 65/1 |
| 3,859,070 | 1/1975 | Slonaker .................................. 65/1 |
| 4,140,507 | 2/1979 | Costin et al. ............................. 65/2 |
| 4,185,980 | 1/1980 | Hinze ....................................... 65/1 |
| 4,240,847 | 12/1980 | Chrisman ........................... 156/62.2 |
| 4,274,852 | 6/1981 | McGarry .................................. 65/2 |
| 4,342,578 | 8/1982 | Bhatti et al. |
| 4,565,559 | 1/1986 | Perkins .................................... 65/2 |

Primary Examiner—Robert L. Lindsay
Attorney, Agent, or Firm—Patrick P. Pacella; Ted C. Gillespie; Robert F. Rywalski

[57] ABSTRACT

An improved laminated bushing is provided for manufacturing fibrous glass products. The bushing comprises a precious metal inner portion which is externally coated with a non-reactive, thermally shock-resistant ceramic. Preferably the ceramic is a crystallographically stabilized zirconia and is applied by arc-plasma spraying.

9 Claims, 2 Drawing Sheets

CLAD PRECIOUS METAL BUSHING AND METHOD FOR MAKING

TECHNICAL FIELD

The present invention relates to the art of glass manufacturing and more particularly it relates to the manufacturing of fibrous glass products. Even yet more specifically, the present invention relates to an improved bushing configuration and to the method for producing such a bushing and to the method of producing glass using such bushing.

BACKGROUND ART

Fibrous glass products have been manufactured for many years using precious metal bushings, or glass feeders. Such glass feeders include a foraminous bottom plate, or wall, commonly referred to in the art as a tip plate, which retains a pool of molten glass. Streams of molten glass issue from the openings, or tips, in the bottom bushing wall. By suitable means the streams of glass are then attenuated and collected in the form of fibers. Such glass feeders, or bushings, must be chemically resistant to the action of molten glass and must be dimensionally stable at high operating temperatures. Currently such bushings are manufactured of a precious metal, which term includes elemental precious metals or alloys, such as platinum or platinum and rhodium alloys.

Precious metals are very expensive. If bushings could be formed with smaller amounts of such precious metals and could be formed of cheaper materials, a tremendous economic advantage would be realized. Furthermore, since the precious metal feeders have a limited life, there is a need in the art to provide for bushings which have an improved operating life.

A difficulty which is also encountered in the use of precious metal bushings stems from the fact that oxygen in the air converts exposed precious metal to an oxide which vaporizes and results in the loss of considerable amounts of precious metal during the fiber forming operation. Obviously, there is a need in the art, therefore, to solve this vaporization problem or at least substantially minimize it.

It is also known that after a period of time, precious metal bushings tend to creep or deform in service. Such creep or deformation adversely effects fiber quality. The deformation requires the bushing to be prematurely removed from service, that is, while the corrosive and erosive affects of the glass have not taken their toll on the feeder the deformation has. Thus, there is a need in the art to provide for a bushing having lower creep and deformation.

The present invention now satisfies these needs in the art and solves the problems which resulted from the use of precious metal bushings. A composite bushing is provided which is inexpensively produced and which allows, if desired, for the use of lower amounts of precious metal. These bushings have long life and reduced creep and deformation because they are, in effect, provided with a ceramic reinforcement material. The bushings will be found to have lower vaporization losses and may even provide for lower energy utilization because of their being provided with the ceramic insulating layer.

DISCLOSURE OF THE INVENTION

In accordance with the present invention an improvement is provided in fibrous glass manufacturing processes of the type which comprises maintaining a pool of molten glass in a glass feeder having a foraminous bottom plate and attenuating a glass stream issuing from said foraminous bottom plate into a glass fiber. The improvement resides in employing a bottom plate which comprises a laminate having a precious metal glass contacting internally disposed surface and an outwardly disposed cladding tenaciously bonded to the precious metal. The cladding preferably comprises a ceramic coating of a crystallographically stabilized zirconia. Preferably the coating is formed by a conventional arc plasma spraying technique with the coating being directly bonded to the precious metal.

Of course, instead of the preferred cladding other suitable non-reactive, thermally shock resistant ceramics may be employed.

The novel bushing of this invention is easily produced by first forming the precious metal bushing, as has generally been done in the past, and then simply applying a non-reactive thermally shock resistance ceramic to outwardly disposed surface portions of the bushing and completing the bushing by then firing the ceramic. This results in the production of a bushing having a tenaciously bonded non-reactive thermally shock resistance ceramic thereon.

BRIEF DESCRIPTION OF THE DRAWINGS

The foregoing and other advantageous features of the present invention will be more readily apparent by reference to the drawings wherein.

DETAILED DESCRIPTION OF THE INVENTION

INCLUDING THE BEST MODE OF CARRYING IT OUT

As used herein when reference is made to a clad precious metal bushing, or a ceramic coating or cladding, or words of similar import this generally contemplates that the precious metal portion of the bushing is first formed and then the ceramic coating applied to it. Whether the bushing is formed with tips, or whether it is a so-called tipless bushing, it will, of course, be apparent that the orifices, or openings in the bottom plate, will need to be masked or plugged during application of the ceramic coating and then the masking or plugs subsequently removed. Brass, and for that matter the composition of the precious metal of the bushing, will be found to be suitable for such plugging purposes.

Figure 1:
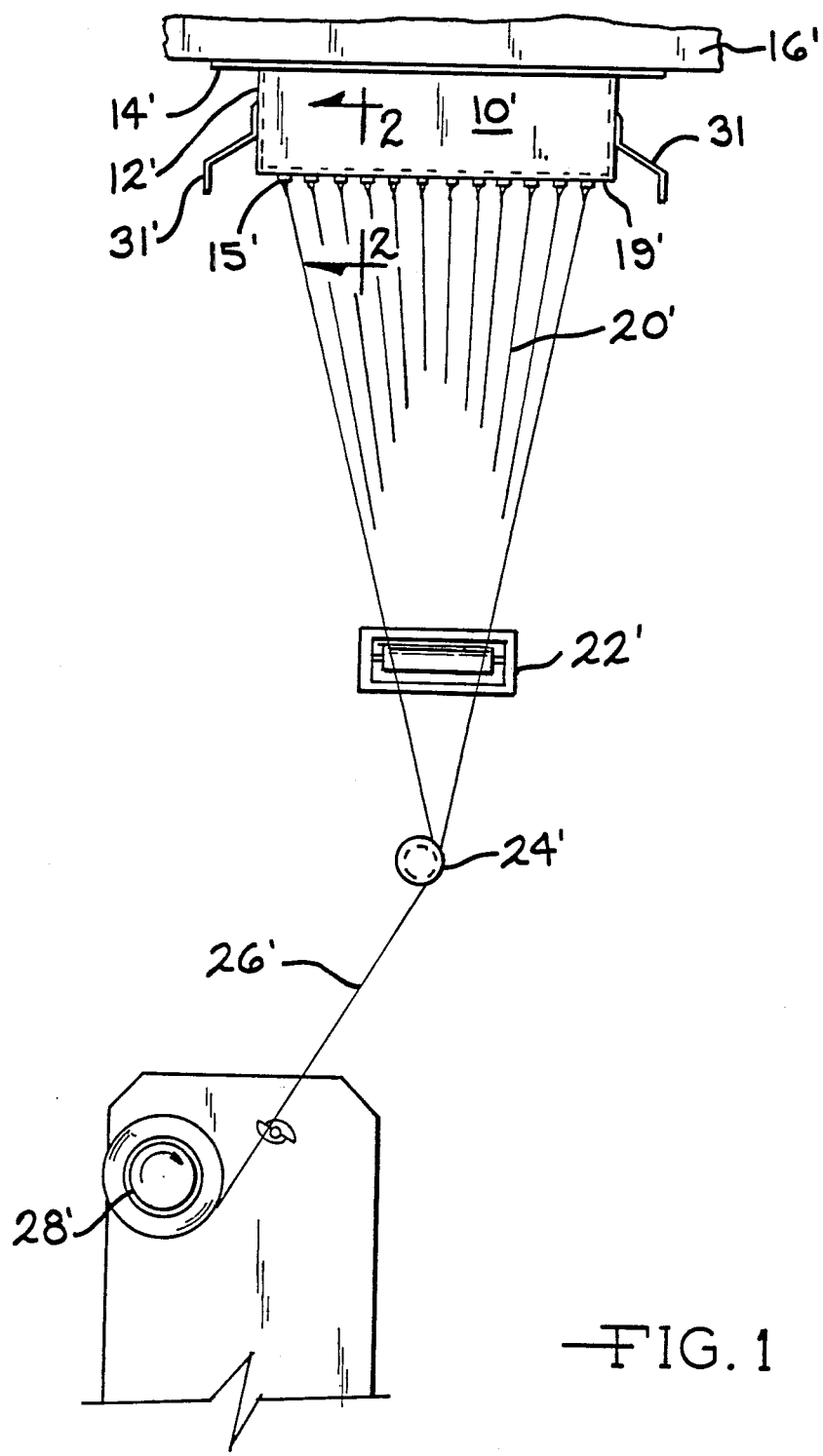
FIG. 1 is a schematic representation illustrating an embodiment of this invention.

Generally, FIG. 1 illustrates a glass feeder, or bushing 10, conventionally employed in the art of fibrous glass manufacture. Bushing 10 includes a generally rectilinear shaped sidewall 12 and disposed at the upper portion thereof is an outwardly extending flange 14 which is adapted to be secured to a supply of molten glass 11. Such a supply of molten glass is typically supplied via a forehearth generally designated 16. Bushings are typically electrically heated and for this purpose suitable terminals as, for example, diametrically opposed ears 31 are provided. Ears 31 are attached to a suitable source of power, not shown, whereby electric current is passed through the bushing 10 including its sidewalls 12 and bottom plate 19. Bottom plate, or wall 19, include orifices or feeder tips, commonly referred to merely as tips 15, which are in fluid communication with the molten glass 11 (best seen in FIG. 2). Glass issues from the foraminous bottom plate 19 and the streams of glass are then attenuated into fibers 20 which, in turn, are passed through a suitable size applicator 22 and then converged through a suitable gathering means 24 in the form of a strand 26. The strand is then collected on a suitable puller, roll up drum or winder 28.

As will be readily appreciated by those skilled in the art, the foregoing is generally a schematic representation of the well-known glass manufacturing method for producing glass fibers. Conventional and well-known techniques are not illustrated. For example, it is well-known that cooling fins are commonly employed adjacently downwardly of the bottom plate 19. The bushing configuration is, obviously, only a general illustration and any configuration commonly employed in the art will be satisfactory.

As was previously indicated, a ceramic coating is applied to form the bushing 10 and the coating is applied on the outwardly disposed surfaces, or portions of the bushing, that is the non-glass contacting portions of bushing or feeder 10. Since electrical contact must be made with the ears 31 so as to pass current through bushing wall 12 and bottom wall 19, portions of ears 31 need to be suitably masked so that the ceramic coating does not completely cover ears 31 and that bare metal is left easily accessible for commonly employed electrical clamping means. As generally contemplated with respect to the illustrations of FIG. 1 and FIG. 2, all the glass contacting portions of bushing 10 are fabricated of a precious metal.

Figure 2:
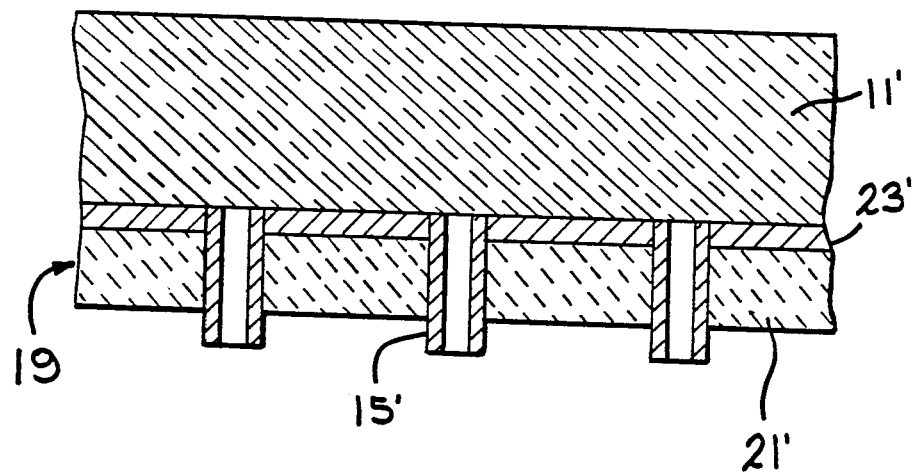
FIG. 2 is a view generally along the line 2—2 of FIG. 1.

FIG. 2 in greater detail illustrates portions of the bottom wall 19 of bushing 10. It will be seen that the bottom wall 19 includes tips 15 passing through the laminated bottom wall namely precious metal layer 23 and the ceramic layer 21. Tips 15 obviously are in fluid communication with molten glass 11 which allows for the attenuation and formation of fibers 20. The thickness of the precious metal layer 23 may vary but exemplary thickness are on the other of about 0.030 to about 0.060 inches. Similarly the thickness of the coated ceramic layer 21 may vary but exemplary thicknesses are on the order of about 0.060 to 0.250 inches.

The precious metal layer 23 may be formed of any suitable elemental precious metal or any suitable precious metal alloy. The preferred precious metal is an alloy of platinum and rhodium generally designated in the art as J alloy.

The composition of the ceramic cladding 21 will be selected so that it is non-reactive with the precious metal and is thermally shock-resistant under the conditions of operation. It will be immediately apparent that silicon carbide and silicon nitride are not satisfactory materials because it is known that they react with the precious metal. Similarly, it will be apparent that chromic oxide is not acceptable because it is known to have poor thermal shock-resistance and it also has poor strength. Thermal barrier ceramics will be found suitable for the present invention. Typically these materials must maintain their strength at temperatures on the order of about 2100°–2600° F. The preferred ceramic material is a commercially available crystallographically stabilized zirconia. Such zirconia is commonly stabilized against disintegration as it proceeds through its various transition phases by such materials as calcia, magnesia, ceria, yttria and alumina. The most highly preferred material is a yttria stabilized zirconia. Generally the stabilizers are employed in amounts of about 6 to about 8% by weight (combined zirconia and stabilizer). The yttria stabilized zirconia is particularly outstandingly adapted for this present application as it has a coefficient of thermal expansion which is substantially identical to commonly employed precious metal alloys. Other suitable ceramics include alumina, titania, hafnia and their alloys, e.g. alumina-titania alloys.

In order to form the laminated bushing of the present invention as indicated above, a precious metal bushing is first formed in the conventional manner. One slight modification that is desired, is that tips 15 will be somewhat axially longer than conventional tips in order to accommodate the thickness of ceramic coating 21 and the increased thickness of bottom wall 19. Once the internal bushing shell is so formed, it is clad with the ceramic by use of an arc-plasma spraying technique. This is a well-known technique for spraying and applying particulate coatings to articles to form laminates in which a hot gas plasma is used to melt a particulate material and transfer it to a substrate where the material solidifies as a coating. Plasma is generally generated by passing a gas between two concentric electrodes where it is heated by a sustained high DC current. Temperatures can reach higher than 30,000° F. which causes the gas to expand and issue from the front electrode nozzle at a very high velocity. Down stream from the arc, powder is injected via a convenient carrier gas and mixed with the plasma. The powder melts and is carried to the substrate where it bonds to form a dense strongly bonded coating. Suitable spray equipment is available from APS Materials, Inc. The ceramic, except for ears 31, is preferably applied by the arc-plasma spraying technique to all of the non-glass contacting areas of bushing 10. Before spraying ceramic coating 21 onto the non-glass contacting portions of the precious metal bushing liner 23, caps are applied to the tips 15 to prevent the powder from entering into the channels intended for glass flow. Suitable caps are made of brass, high temperature polymers, silicone rubbers, or of the composition of precious metal 23.

After the ceramic has been applied to the externally exposed surfaces of the precious metal bushing preform, the composite is heated to further sinter the ceramic. This enhances bonding and may be done at any convenient temperature. Typically, when applying yttria stabilized zirconia, outstanding results have been obtained by generally using a heat-up and cool-down rate of about 18° F. per minute and a holding temperature of about 2732° F. for about six hours. Under these conditions the ceramic coating 21 attains on the order of at least 80 to 85% of theoretical density and it becomes tenaciously bonded directly to precious metal 23. The ceramic materials, especially the yttria stabilized zirconia, provides a reinforcing affect to bottom wall 19 of bushing 10 and provides outstanding strength improvement and makes the bushing more creep resistant. The ceramic coating can be directly applied to precious metal 23 without the use of a bond enhancing coating. Preferably, however, notwithstanding that a bond coat is not employed, good practice dictates grit blasting the surface of the precious metal to roughen it for better bonding prior to the application of the ceramic coating.

In actual operating environments, use of the bushing described above has shown outstanding strength and appears to enhance alloy containment by minimizing vaporization.

While the above has described the present invention it will, of course, be apparent that modifications are possible which pursuant to the patent statutes and laws do not depart from the spirit and scope thereof.

I claim:

1. In a fibrous glass manufacturing process comprising maintaining a pool of molten glass in a glass feeder having a foraminous bottom plate, and attenuating a glass stream issuing from said foraminous bottom plate into a glass fiber, the improvement wherein said bottom plate comprises a laminate having a precious metal glass contacting internal surface and an outwardly disposed cladding tenaciously bonded to said precious metal, said cladding comprising a coating of zirconia crystallographically stabilized with effective stabilizing amounts of yttria and wherein said coating has a thickness of about 0.060 to about 0.250 inches.

2. The improvement of claim 1 wherein said coating is formed by arc-plasma spraying and wherein said coating is directly bonded to said precious metal.

3. In a fibrous glass manufacturing process comprising maintaining a pool of molten glass in a glass feeder having a foraminous bottom plate, and attenuating a glass stream issuing from said foraminous bottom plate into a glass fiber, the improvement wherein said feeder comprises a laminate of an inwardly disposed precious metal glass contacting layer and an outwardly disposed coating of a non-reactive, thermally shock-resistant yttria stabilized zirconia having a thickness of about 0.060 to about 0.250 inches.

4. The improvement of claim 3 wherein said ceramic is applied by arc-plasma spraying said ceramic directly onto said precious metal layer.

5. A method comprising applying a non-reactive, thermally shock-resistant yttria stabilized zirconia to an outwardly disposed surface portion of the bottom wall of a precious metal glass fiber-forming bushing and heating said bushing bottom wall and applied zirconia, sufficient zirconia being employed so that the thickness of the applied zirconia is about 0.060 to about 0.250 inches.

6. The method of claim 5 wherein said precious metal is an alloy of Pt and Rh.

7. The method of claim 5 wherein said zirconia is applied by arc-plasma spraying.

8. In a precious metal bushing for forming glass fibers having an apertured bottom plate, the improvement wherein said precious metal bottom plate carries a tenaciously bonded outwardly disposed coating of non-reactive, thermally shock-resistant yttria stabilized zirconia having a thickness of about 0.060 to about 0.250 inches.

9. The improvement of claim 8 wherein said zirconia coating is applied by arc-plasma spraying.

* * * * *